3,395,153
3,5-DIALKYLHYDANTOINS
Kiyoshi Kitasaki, Garden Grove, Irving S. Bengelsdorf, Tustin, and Robert F. Crawford, La Mirada, Calif., assignors to United States Borax & Chemical Corporation, Los Angeles, Calif., a corporation of Nevada
No Drawing. Filed Dec. 16, 1964, Ser. No. 418,882
8 Claims. (Cl. 260—309.5)

ABSTRACT OF THE DISCLOSURE 3,5-dialkylhydantoins in which the alkyl group at the 3-position contains 3–6 carbon atoms and the alkyl group at the 5-position contains 1–4 carbon atoms. The compounds are useful as herbicides and can be formulated with conventional herbicide carriers.

---

This invention relates to novel herbicidal compositions and methods utilizing 3,5-dialkylhydantoins.

According to the present invention, there are provided herbicidal compositions and methods utilizing hydantoin compounds of the formula

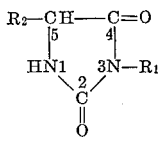

where $R_1$ is alkyl of from 3 to 6 carbon atoms, and $R_2$ is alkyl of from 1 to 4 carbon atoms, inclusive. Thus, the substituent at the 3 position is an alkyl group, straight chain or branched, such as n-propyl, isopropyl, n-butyl, sec-butyl, isobutyl, tert-butyl, n-pentyl, isopentyl and n-hexyl. Substituents in the 5-position represented by $R_2$, are alkyl, straight chain or branched, of 1 to 4 carbon atoms, such as methyl, ethyl, n-propyl, isopropyl, n-butyl, and isobutyl.

The hydantoins of the present invention are normally crystalline solids which are soluble in the usual organic solvents, such as alcohols, ethers, and aromatic hydrocarbons. They are readily prepared by cyclization of the corresponding hydantoate with dilute mineral acid such as aqueous hydrochloric acid. The hydantoate is prepared by first converting the appropriate amino acid ester to the corresponding isocyanato compound which is then reacted with the corresponding $C_3$ to $C_6$ alkylamine to give the hydantoate.

The following equations illustrate the general scheme of preparation:

(A)
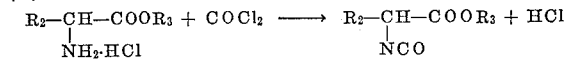

(B)
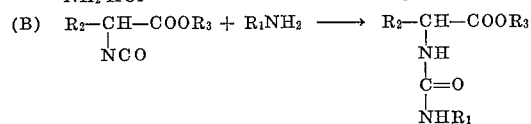

(C)
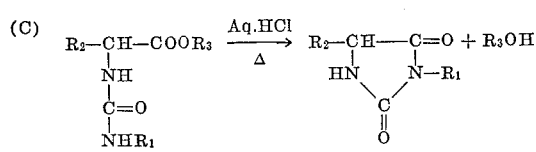

where $R_3$ preferably is a lower alkyl group and $R_1$ and $R_2$ have the significance previously assigned.

In the reaction illustrated by Equation A, the isocyanato compound is formed by the known reaction of the amine with phosgene in a relatively high boiling solvent, such as toluene, xylene, or the like. The isocyanato compound is then reacted with the $C_3$–$C_6$ alkylamine in the presence of an inert solvent such as ether, benzene or toluene at ambient or elevated temperature such as the reflux temperature of the solvent as illustrated by Equation B. It is not necessary to isolate the hydantoate since, after removing most of the solvent, it can be heated at an elevated temperature with aqueous mineral acid such as hydrochloric acid to form the corresponding substituted hydantoin as illustrated by Equation C. The normally water-insoluble crystalline hydantoin is removed by conventional procedures and purified by recrystallization from an appropriate solvent such as alcohol-water mixtures.

The substituted hydantoins of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foliage of the growing plants or soil in which the plants are growing or will grow.

An application rate in the range of from about 1 to about 50 pounds of one or more of the active compounds per acre is generally an effective phytotoxic amount, although greater or lesser amounts can be used if desired. The presently preferred application rate is in the range of from about 4 to about 25 pounds per acre. The 3-butyl-5-lower alkylhydantoins and 3-pentyl-5-lower alkylhydantoins are preferred for non-selective herbicidal applications.

The following examples are presented to illustrate the preparation of and herbicidal activity of typical compounds of this invention, but it is to be understood that the invention is not limited to the specific examples given.

Example I.—Ethyl 2-isocyanatopropionate

A suspension of 159 grams (1.01 moles) of ethyl 2-aminopropionate hydrochloride in 1.5 liter of toluene was refluxed for two hours with a Dean-Stark trap to remove traces of water and ethanol. Phosgene was bubbled into the refluxing solution for six hours. The mixture was cooled, filtered and concentrated at reduced pressure. Distillation of the residual oil at 69°–74° C./19 mm. yielded 92.7 grams (64%) of the desired product; $n_D^{24}$ 1.4181.

3-n-propyl-5-methylhydantoin

Ethyl 2-isocyanatopropionate (14.4 g.; 0.1 mole) was added dropwise over a two-hour period to a solution of 9.5 grams (0.1 mole) of n-propylamine in 100 ml. of benzene. The reaction product was concentrated under reduced pressure, 60 ml. of 6 N hydrochloric acid was added and the solution refluxed for four hours. The acid solution was concentrated to dryness and the solid residue was recrystallized from water to give 6.8 grams of crystalline solid, M.P. 52°–56° C.

The compound was dissolved in methanol and applied, as a pre-emergence treatment at a rate of 25 pounds of hydantoin per acre, to corn, millet, mustard, peas and cucumber. The corn was not injured, but a complete kill or non-emergence of all other species was observed.

Example II.—3-isobutyl-5-methylhydantoin

A mixture of 10 ml. (0.078 mole) of ethyl 2-isocyanatopropionate and 5.7 grams (0.078 mole) of isobutylamine in 100 ml. of benzene was refluxed for 1.5 hours. The benzene solution was concentrated under reduced pressure and 50 ml. of 3 N hydrochloric acid was added. The resultant acidic solution was refluxed for four hours.

The acidic solution was concentrated to a viscous oil and 75 ml. of ethyl ether was added. The ethereal solution was concentrated to give 12.7 grams (96% yield) of a solid residue, M.P. 57°–61° C., which, after recrystallization from heptane, melted at 59°–61° C.

Application of the compound at a rate of 25 pounds per acre, as a post-emergence treatment, to mustard, cucumber, and bean plants, gave a complete kill of all plants.

Example III.—3-n-pentyl-5-methylhydantoin

Ethyl 2-isocyanatopropionate (7.2 g.; 0.05 mole) was added to a solution of 4.4 grams (0.05 mole) of n-amylamine in 100 ml. of benzene. The solution was refluxed for 1.5 hours and benzene was then removed under reduced pressure. The residual hydantoate was refluxed for four hours in 40 ml. of 6 N hydrochloric acid, and the solution was concentrated to a thick syrup. The syrup was dissolved in 75 ml. of ethyl ether and then concentrated. A solid residue was obtained; 6.4 grams (69.5%). This solid was recrystallized from ethyl ether and 4.12 grams of crystalline product melting at 59.5°–61.5° C. was isolated.

Application of the compound at a rate of 15 pounds per acre, as a pre-emergence treatment, to a flat which had been planted to corn, millet, rye grass, oats, peas, mustard, cucumbers and snap beans prevented emergence or killed substantially all the plants except for corn which exhibited only moderate injury.

Example IV.—3-n-hexyl-5-methylhydantoin

Ethyl 2-isocyanatopropionate (10.8 g.; 0.075 mole) was added to a stirred solution of 7.6 grams (0.075 mole) of n-hexylamine in 100 ml. of benzene and the mixture was refluxed for two hours. Benzene was removed under reduced pressure and the hydantoate was refluxed for four hours in 50 ml. of 6 N hydrochloric acid. The reaction mixture was concentrated under reduced pressure and the residual oil was treated three times with 50 ml. portions of ethyl alcohol and concentrated after each treatment. The solid product (10.5 g.; 71%) which was isolated, melted at 53°–57° C. Sublimation and then recrystallization from a methanol-water mixture gave the crystalline product, M.P. 60°–62° C.

Application of the compound as a post-emergence treatment, at a rate of 15 pounds per acre, gave a complete kill of cucumber and snap bean plants.

Example V.—3-n-butyl-5-methylhydantoin

A suspension of 15 grams of 2-methyl-5-butylhydantoic acid (prepared by reaction of n-butyl isocyanate with 2-aminopropionic acid) in 60 ml. of 6 N hydrochloric acid was refluxed for 3.5 hours. The acidic solution was concentrated at reduced pressure (20 mm.) and an oily residue was obtained. The residual liquid was dissolved in 5 ml. of water and 50 ml. of methanol and was decolorized with carbon. The clear solution was taken to dryness and 8.6 grams (63%) of product was obtained, M.P. 47°–49° C.

The compound was applied, at a rate of 25 pounds per acre as a pre-emergence treatment, to corn, oats, millet, mustard, peas, cucumbers and snap beans. A complete kill of corn, oats, millet, mustard, cucumber and peas and severe herbicidal effects on snap beans was observed.

Example VI.—Ethyl 2-isocyanatobutanoate

A solution of 160 grams (0.955 mole) of ethyl 2-aminobutanoate hydrochloride in one liter of toluene was refluxed and traces of water and ethanol were removed using a Dean-Stark trap. Phosgene was then bubbled into the refluxing solution for six hours. Toluene was removed under reduced pressure and the residual oil was distilled, B.P. 88°–91° C./16 mm., to give 125.1 grams (79.5%) of the product; $n_D^{24}$ 1.4216.

3-n-butyl-5-ethylhydantoin

A solution of 15.7 grams (0.1 mole) of ethyl 2-isocyanatobutanoate in 25 ml. of benzene was added slowly to a solution of 10.0 grams (0.1 mole) of n-butylamine in 100 ml. of benzene. The solution was refluxed for two hours. Benzene was removed under reduced pressure and the residue was refluxed for three hours with 50 ml. of 6 N hydrochloric acid. Water and acid were removed at reduced pressure and the residual oil was dissolved in 100 ml. of ethanol and concentrated. The ethanol treatment was repeated and a solid residue was obtained. The product was recrystallized from cyclohexane and 11.1 grams (60.5%) of the hydantoin was isolated, M.P. 42°–46° C. A second recrystallization from cyclohexane raised the melting point to 43°–46° C.

The compound was applied as a pre-emergence treatment, at a rate of 15 pounds per acre, to oats, rye grass, millet, mustard, peas and cucumber at the time of planting. Twenty-four days after treatment, a complete kill or non-emergence of all plants was observed.

Example VII.—Ethyl 2-isocyanatopentanoate

A suspension of 200 grams of 2-aminopentanoic acid in 1700 ml. of ethyl alcohol was saturated with dry hydrogen chloride gas and the resultant solution was refluxed for six hours. Ethyl alcohol was removed by distillation under reduced pressure until a thick, oily residue was obtained. The residue was suspended in 1500 ml. of toluene and refluxed until final traces of water and ethyl alcohol were removed as a toluene azeotrope. Phosgene was bubbled into the dry, refluxing toluene suspension for 6.5 hours and the toluene then removed by distillation under reduced pressure. The residual oil was distilled at 105°–107° C./25–26 mm. and 212.9 grams (77%) of the ethyl 2-isocyanatopentanoate was obtained; $n_D^{24}$ 1.4258.

3-isobutyl-5-n-propylhydantoin

A mixture of 6.8 grams (0.04 mole) of ethyl 2-isocyanatopentanoate and 3.0 grams (0.04 mole) of isobutylamine in 50 ml. of benzene was refluxed for one hour and then concentrated. The residue was refluxed for four hours with 20 ml. of 6 N hydrochloric acid and sufficient ethyl alcohol to form a clear solution. The hot solution was filtered and the product crystallized upon cooling. The solid product was isolated by filtration, washed with water and dried; M.P. 91°–93° C., yield 6.7 grams (85%). An analytical sample was recrystallized from a water-ethyl alcohol mixture; M.P. 91°–92° C.

Application of the compound as a pre-emergence treatment at a rate of 40 pounds per acre gave a complete kill or non-emergence of millet, rye grass, oats, peas, mustard, cucumber and snap bean plants.

Example VIII.—Ethyl 2-isocyanato-3-methylbutanoate

Phosgene was bubbled into a refluxing solution of 355 grams (2.12 moles) of ethyl 2-amino-3-methylbutanoate hydrochloride in 1500 ml. of toluene over a 7-hour period. The solution was concentrated, filtered and fractionated to give 240.2 grams (66.4% yield) of the desired ester, B.P. 95°–98°C./23 mm.; $n_D^{24}$ 1.4257.

3-isopentyl-5-isopropylhydantoin

Ethyl 2-isocyanato-3-methylbutanoate (6.8 g.; 0.04 mole) was added to a solution of 3.5 grams (0.04 mole) of isoamylamine in 50 ml. of benzene and the mixture was refluxed for one hour. Benzene was removed under reduced pressure and the residue was refluxed for four hours with 20 ml. of 6 N hydrochloric acid and sufficient ethyl alcohol to form a clear solution. The acidic solution was concentrated and the residual oil was extracted with ethyl ether. The ethereal solution was evaporated and the residue was recrystallized from hexane, M.P. 51°–53° C., yield 4.9 grams (57%).

The compound was applied at a rate of 25 pounds per acre, as both a pre-emergence and post-emergence treatment, to millet, mustard, and cucumber plants. A complete kill of all plants was observed.

Example IX.—3-n-butyl-5-isopropylhydantoin

Ethly 2-isocyanato-3-methylbutanoate (7.96 g.; 0.05 mole) was added dropwise to a solution of 3.7 grams (0.05 mole) of n-butylamine in 100 ml. of benzene and the mixture was refluxed for two hours. Benzene was removed by distillation under reduced pressure, 30 ml. of 6 N hydrochloric acid was added and the acidic mixture was refluxed for 2.5 hours. Water was removed under reduced pressure and the residual oil was distilled at 145°–150° C. (0.5 mm.) to give 6.1 grams of yellow, waxy solid on standing.

The compound was applied at a rate of 15 pounds per acre, as pre-emergence treatment, to flats planted to corn, millet, oats, mustard and cucumbers. A complete kill or non-emergence of all plants was observed.

Example X.—Ethyl 2-isocyanatohexanoate

A suspension of 200 grams (1.02 moles) of DL norleucine (2-aminohexanoic acid) in two liters of ethyl alcohol was saturated with anhydrous hydrogen chloride. The clear solution was stirred and refluxed for four hours and allowed to stand overnight. The ethanolic solution was concentrated at reduced pressure and the residual oil was treated twice with 100 ml. portions of ethanol (dissolved and concentrated to remove acid and water). The crude hydrochloride salt was dissolved in 2.0 liters of toluene and phosgene was bubbled into the mixture for six hours at a vigorous rate. Toluene was removed by distillation and the concentrated reaction mixture was filtered and then distilled thorugh a two foot vacuum-jacketed column. The product was collected at B.P. 118°–119° C. (24–26 mm.).

3-n-propyl-5-n-butylhydantoin

Ethyl 2-isocyanatohexanoate (7.4 g.; 0.04 mole) was added to a solution of 2.4 grams (0.04 mole) of n-propylamine in 50 ml. of benzene and the solution was refluxed for one hour. Benzene was removed at reduced pressure and the residue was refluxed with 20 ml. of 6 N hydrochloric acid and 20 ml. of ethyl alcohol for four hours. The product precipitated when the solution was cooled and was separated by filtration, washed with water and dried; M.P. 74°–75° C.; yield 6.8 grams (86%).

The compound was applied as a post-emergence treatment at a rate of 25 pounds per acre to peas, mustard, cucumbers and millet. Most of the millet plants and all of the other species were killed.

Example XI.—3,5-di-n-butylhydantoin

Ethyl 2-isocyanatohexanoate (7.4 g.; 0.04 mole) was added to a solution of 3.0 grams (0.04 mole) of n-butylamine in 50 ml. of benzene and a solution refluxed for one hour. The reaction mixture was concentrated at reduced pressure and the residual material was refluxed for four hours in 20 ml. of 6 N hydrochloric acid. Ethyl alcohol was added to the refluxing mixture until a clear solution was obtained. The acidic solution was cooled and the precipitated product was separated by filtration and washed with water; M.P. 85°–86° C.; yield 8.1 grams (97%). Further recrystallization from water gave the pure compound which melted at 86°–87° C.

When a methanolic solution of the compound was applied as a post-emergence treatment at a rate of 7.5 pounds per acre to mustard plants, a complete kill of the plants was observed after 23 days.

Among the many other compounds embraced by the present invention which can be prepared according to the procedures described above are:

3-isopropyl-5-methylhydantoin, M.P. 64°–65° C.
3-sec-butyl-5-methylhydantoin, M.P. 63°–69° C.
3-tert-butyl-5-methylhydantoin, M.P. 57°–61° C.
3-isopentyl-5-methylhydantoin, M.P. 78.5°–80° C.
3-n-pentyl-5-ethylhydantoin, M.P. 67°–69° C.
3-n-butyl-5-n-propylhydantoin, M.P. 74°–75° C.
3-n-pentyl-5-n-propylhydantoin, M.P. 79°–80° C.
3-isopentyl-5-n-propylhydantoin, M.P. 78.5°–79.5° C.
3-n-pentyl-5-n-butylhydantoin, M.P. 105–106.5° C.

Since a relatively small amount of one or more of the active substituted hydantoins should be uniformly distributed over the area to be treated, the compounds preferably are formulated with conventional herbicidal carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salts of naphthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active substituted hydantoins with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as sodium chlorate, borax, sodium metaborate, 2,3,6-trichlorobenzyloxypropanol, the chlorophenoxyacetic acids, trichlorobenzoic acids, substituted ureas, triazines, uracils and carbamates, can be included in the formulations.

The following examples are presented to illustrate the preparation of suitable herbicidal compositions of this invention.

Example XII

| | Percent |
|---|---|
| 3-n-butyl-5-methylhydantoin (powdered) | 4 |
| Granular clay | 96 |

A granular formation can be prepared by dry blending the above constituents until uniformly mixed in a rotary mixer. A fine spray of water is sprayed onto the mixture, while tumbling, to adhere the compound to the clay. The material is then air dried while tumbling to give a granular formulation which can be applied to the soil or vegetation by hand or by a mechanical spreader.

Example XIII

| | Percent |
|---|---|
| 3-n-butyl-5-ethylhydantoin | 85 |
| Bentonite clay | 14 |
| Sodium lauryl sulfate surfactant | 1 |

A wettable powder formulation can be prepared by micronizing the hydantoin and mixing uniformly with powdered bentonite clay and powdered sodium lauryl sulfate. The wettable powder can be added to water or hydrocarbon oil and mechanically agitated to insure a uniform dispersion which can be sprayed with conventional equipment on soil or vegetation.

Example XIV

| | Percent |
|---|---|
| 3-n-butyl-5-isopropylhydantoin | 15 |
| Polyoxyethylenesorbitan monolaurate | 2 |
| Isopropanol | 20 |
| Xylene | 63 |

The hydantoin is dissolved in a mixture of isopropanol and xylene to form a concentrated solution. The emulsifying agent is then dissolved and a liquid formulation of an emulsifiable concentrate is obtained. The emulsificable concentrate can be added to water to dilute to a desired concentration, and then be sprayed with conventional equipment on soil or vegetation.

Example XV

| | | |
|---|---|---|
| 3-n-pentyl-5-methylhydantoin | lb. | 0.1 |
| Petroleum hydrocarbon weed oil | gal. | 1 |

The hydantoin is dissolved in a petroleum hydrocarbon weed oil. The formulation can be sprayed with conventional spray equipment on vegetation at a volume of 100 gal./a. to give an application rate of 10 pounds of the hydantoin per acre.

Example XVI

| | Percent |
|---|---|
| 3-isobutyl-5-methylhydantoin | 4 |
| Sodium tetraborate pentahydrate | 96 |

Granular sodium tetraborate pentahydrate is dry blended with the powdered hydantoin. Five percent watter is added to the blended mixture to adhere the hydantoin to the granular borate and the mixture then air-dried. The granular formulation can be applied by hand or with a mechanical spreader to the soil or on vegetation.

Various changes and modifications of the invention can be made and, to the extent that such variations incorporate the spirit of this invention, they are intended to be included within the scope of the appended claims.

We claim as our invention:
1. 3-pentyl-5-lower alkylhydantoin in which said lower alkyl group is of from 1 to 4 carbon atoms.
2. 3-n-pentyl-5-methylhydantoin.
3. 3-isopentyl-5-methylhydantoin.
4. 3-n-pentyl-5-ethylhydantoin.
5. 3-isobutyl-5-n-propylhydantoin.
6. 3-n-butyl-5-isopropylhydantoin.
7. 3-n-butyl-5-ethylhydantoin.
8. 3-n-hexyl-5-methylhydantoin.

References Cited

FOREIGN PATENTS 644,132 7/1962 Canada.
1,039,302 3/1959 Germany.

OTHER REFERENCES

Schlögl: Monatshefte für Chemie, vol. 89, pp. 382–90 relied on (1958).

Ulsperger et al.: Journal für Praktische Chemie, vol. 21, p. 232 relied on (October 1963).

HENRY R. JILES, *Primary Examiner.*

N. TROUSOF, *Assistant Examiner.*